Patented July 15, 1952

2,603,551

UNITED STATES PATENT OFFICE 2,603,551

WATER SOLUBLE CELLULOSIC YARN PRODUCED BY REACTING CELLULOSE, SULPHURIC ACID, CYANAMIDE, AND A METAL SULFATE

Frank Ward, Braintree, and Ernest Edward Tallis, Coventry, England, assignors to Courtaulds Limited, London, England, a British company No Drawing. Application July 15, 1949, Serial No. 105,058. In Great Britain July 27, 1948

6 Claims. (Cl. 8—116.2)

This invention relates to the production of a cellulose compound which is soluble in water.

In United States Letters Patent No. 2,503,261, issued November 14, 1950, we have described a process for impregnating cellulosic textile fibres, yarns or fabrics with an aqueous solution containing a non-volatile strong mineral acid and cyanamide, drying and baking the impregnated fibres, yarns or fabrics to effect reaction between the cellulose, the mineral acid and the cyanamide, the process being conducted under such conditions as to quantities, temperatures and times that the final product contains at least 1 per cent by weight based on the weight of the fibres, yarns or fabrics of combined acid and preferably a total of at least 3 per cent by weight of the combined acid and cyanamide together based on the weight of the fibres, yarns or fabrics. In carrying out this process a definite chemical combination takes place between the cellulose, the acid and the cyanamide throughout the body of the material. The process improves the properties of the treated materials, for example, their crease-resistance and fire-resistance.

The object of the present invention is to produce a cellulose compound which is soluble in water.

According to the present invention cellulose material is impregnated with an aqueous solution containing sulphuric acid and cyanamide and the impregnated material is treated to complete the reaction between the cellulose, sulphuric acid and cyanamide, the impregnated material containing sufficient sulphuric acid to produce a final water-soluble product which contains not less than about 25 per cent by weight of combined sulphuric acid.

In carrying out the process of the present invention we prefer to add to the impregnating solution an alkali metal sulphate or ammonium sulphate.

The process is preferably carried out on undried regenerated cellulose material, that is cellulose material which is still in the swollen state.

The treatment necessary to complete the reaction between the cellulose, sulphuric acid and cyanamide may consist of a drying step alone or a drying step followed by a baking step.

The solubility in water of the final product obtained by the process of the present invention appears to depend on the amount of combined sulphuric acid and on the uniformity of the treatment. For example, material treated under uniform conditions having a combined sulphuric acid content of 25 per cent is soluble in water at 20° centigrade but owing to the difficulty of obtaining complete uniformity a product having a combined sulphuric acid content of at least 26 per cent to 26.5 per cent is necessary to give solubility at 20° centigrade, although a product having a combined sulphuric acid content of 25 per cent to 25.5 per cent will dissolve in water at 50° centigrade. The amount of combined sulphuric acid in the final product depends on the amount of free sulphuric acid taken up by the material from the impregnating bath. Slight variations in the amount of free sulphuric acid taken up or changes in the concentration of sulphuric acid present in the impregnating bath or uneven drying will necessarily affect the solubility properties of the final product. The product appears to be an ammonium salt of the half-ester of sulphuric acid and cellulose.

The cellulose material preferably employed is regenerated cellulose material, for example rayon filaments made by the viscose process but other cellulose material, for example natural fibres such as cotton, may be used. With the natural fibres the water imbibition is normally low and it is necessary to subject the natural fibres to a swelling treatment with, for example, caustic soda, before subjecting them to the process of the present invention. The regenerated cellulose material used for carrying out the process of the present invention may be in the undried state, for example undried rayon yarn obtained by washing rayon cakes produced by the viscose process, an undried tow of continuous filaments of rayon produced by the viscose or cuprammonium processes, or rayon staple obtained by cutting an undried tow of continuous filaments or a regenerated cellulose film which has not been subjected to a drying process. Dry regenerated cellulose material may also be used as the starting material provided that the necessary steps are taken to ensure that sufficient of the impregnating solution is taken up by the material to produce the required amount of combined sulphuric acid; this may be effected, for example, by increasing the concentrations of the sulphuric acid and cyanamide in the impregnating solution or by increasing the weight of solution left on the cellulose material after hydroextraction.

The impregnation is preferably carried out with the impregnating solution maintained below room temperature to improve the stability of the solution. The addition to the impregnating solution of an alkali metal sulphate or ammonium sulphate prevents undue degradation of the cellulose material. After impregnation, excess of the impregnating bath is removed, for example, by hydroextraction, care being taken to see that a sufficient quantity of the impregnating bath is left on the cellulose material to ensure the production of a final water-soluble product. The material is then subjected to treatment to complete the reaction between the cellulose, sulphuric acid and cyanamide. This treatment may consist of a drying step alone or a drying step followed by a baking step. When the treatment is to be effected by drying only, the drying is carried out, for example, for a period of 10 to 30 minutes at a temperature between 85° centigrade and 100° centigrade but when the drying is to be followed by baking, the drying may be carried out for example for a period of 5 to 30 minutes at 50° to 80° centigrade, and the baking may be carried out, for example, by heating at temperatures above 100° centigrade, for example, at 120° to 160° centigrade for 5 to 30 minutes. The drying is carried out as uniformly as possible since uneven drying causes soluble salts to migrate from one part of the material to other parts of the material. The drying may be carried out in a stove with a rapidly moving current of air.

After the completion of the treatment the material is washed, to remove the water-soluble salts, in solutions which will not dissolve or unduly swell the material. For example washing may be carried out in a solution containing 50 parts of alcohol and 50 parts of water followed, if necessary, by neutralising in a solution containing 50 parts of alcohol and 50 parts of water and sufficient ammonia to neutralise any unreacted acid remaining in the material. The material is then dried.

The cellulose material treated in accordance with the present invention has fire-resistant properties. Water-soluble yarns produced by the process of the present invention can be used as a carrier yarn or as a core yarn in the production of effect threads or fabrics, for example the water-soluble yarn may be used as a scaffolding thread to support a yarn which is not capable of withstanding the normal weaving process and the water-soluble yarn may be subsequently removed by washing. The water-soluble cellulose compounds obtained can also be used for the production of sizes by dissolving the cellulose compound in water and applying the aqueous solution by the usual methods. The size is readily removed by washing.

The following examples will illustrate the present invention, the parts being by weight:

Example 1

A skein of rayon yarn weighing 3 to 4 grams obtained from a cake made by the viscose process which had been washed but not dried and containing 30 per cent to 50 per cent of bone-dry cellulose was impregnated for 10 minutes in an aqueous solution containing 13.3 per cent of cyanamide, 15.5 per cent of sulphuric acid and 16.9 per cent of ammonium sulphate. The skein was hydroextracted in such a manner that the skein finally contained not more than 28 per cent of bone dry cellulose, dried at 54° centigrade for 7 minutes and baked at 140° centigrade for 10 minutes. The drying and baking were carried out in a stove in a rapidly moving air current. The skein was washed in a solution containing 50 parts of alcohol and 50 parts of water and dried. The yarn obtained was completely soluble in cold water. Analysis showed that the bone-dry yarn contained 28.8 per cent of combined sulphuric acid.

Example 2

A skein similar to that used in Example 1 was impregnated with an aqueous solution 27.6 per cent of cyanamide, 17.2 per cent of sulphuric acid and 9.3 per cent of ammonium sulphate for 10 minutes at 0° centigrade. The impregnated skein was hydroextracted under the same conditions as described in Example 1 and was dried at 95° centigrade for 10 minutes. The yarn was washed as described in Example 1 and dried. The yarn was readily soluble in cold water and contained 31.5 per cent of combined sulphuric acid.

Example 3

A skein of conditioned rayon made by the viscose process which weighed 3.41 grams was impregnated in an aqueous solution containing 21.9 per cent of cyanamide, 22.7 per cent of sulphuric acid and 12.4 per cent of ammonium sulphate for 10 minutes at 0° to 5° centigrade. After hydroextraction for 2 minutes the skein weighed 8.11 grams and had absorbed 1.160 grams of sulphuric acid. The skein was dried at 70° centigrade for 7 minutes and then baked at 140° centigrade for 10 minutes. The skein was washed as described in Example 1 and dried. Analysis showed that the yarn contained 27.5 per cent of combined acid. The yarn was easily soluble in cold water.

Example 4

A skein of dry cotton of 150 metres in length weighing 3.09 grams was immersed in 20 per cent caustic soda solution for 10 minutes at room temperature. The skein was washed free from caustic soda and was hydroextracted. The skein weighed 6.75 grams. The skein was impregnated in an aqueous solution prepared by mixing together 30 cubic centimetres of 57 per cent cyanamide solution, 28 cubic centimetres of 52 per cent sulphuric acid and 5 grams of ammonium sulphate, for 10 minutes of at 0° centigrade. The skein was removed from the solution and hydroextracted under conditions so that the skein weighed 8.4 grams. The skein was dried at 60° centigrade for 10 minutes and baked at 140° centigrade for 10 minutes. The skein was washed in 50 per cent aqueous alcohol and redried. The yarn was soluble in water at 50° centigrade.

Example 5

A skein of viscose rayon weighing 3 to 4 grams obtained from a cake which has been washed but not dried and containing about 50 per cent of bone dry cellulose was soaked for 2 to 3 minutes in an aqueous solution containing 18 grams of sodium bisulphate, 7 cubic centimetres of 10 normal sulphuric acid and 30 cubic centimetres of a 33 per cent solution of cyanamide. The skein was hydroextracted, dried at 60° centigrade and baked at 140° centigrade for 2 minutes. The skein was washed in a solution containing 50 parts of alcohol and 50 parts of water and then in a similar solution containing sufficient ammonia to neutralise all the acid present in the yarn. The skein was then dried. The yarn obtained was fire-resistant, had good physical properties and was readily soluble in water.

Example 6

A skein similar to that used in Example 5 was impregnated with an aqueous solution containing 12 grams of ammonium sulphate, 13 cubic centimetres of 15 normal sulphuric acid and 30 cubic centimetres of a 33 per cent solution of cyanamide. The impregnated skein was hydroextracted, dried, baked and washed as in Example 1 and the skein was finally dried. The yarn obtained was fire-resistant, had good physical properties and was readily soluble in water. Analysis showed that the bone dry yarn contained 4.7 per cent nitrogen and 26.5 per cent of combined sulphuric acid.

What we claim is:

1. A water soluble yarn consisting of the ammonium salt of the half-ester of cellulose and sulphuric acid and containing not less than about 25% of combined sulphuric acid, acid yarn having been produced by uniformly impregnating cellulose yarn in a swollen state with an aqueous solution containing at least 15.5% of sulphuric acid, at least 13.3% of cyanamide and a sulphate selected from the group consisting of ammonium sulphate and an alkali metal sulphate and uniformly heating the impregnated yarn at a temperature from 85° C. to 160° C. to complete the reaction between the cellulose, sulphuric acid and cyanamide.

2. A process for the production of a water-soluble cellulose derivative which comprises uniformly impregnating cellulose material in a swollen state with an aqueous solution containing at least 15.5% of sulphuric acid, at least 13.3% of cyanamide and a sulphate selected from the group consisting of ammonium sulphate and an alkali metal sulphate and heating the impregnated material at a temperature from 85° C. to 160° C. to complete the reaction between the cellulose, sulphuric acid and cyanamide so as to obtain a final product which contains not less than 25% by weight of combined sulphuric acid.

3. The process of claim 2 wherein the impregnated material is heated at a temperature between 85° and 100° centigrade for a period of 10 to 30 minutes and is thereby dried.

4. The process of claim 2 wherein the impregnated material is heated at a temperature between 50° and 80° centigrade for a period of 5 to 30 minutes, with consequent drying and is thereafter baked at a temperature above 100° centigrade for a period of 5 to 30 minutes.

5. The process of claim 2 wherein the cellulose material is regenerated cellulose filaments made from viscose.

6. The process of claim 2 wherein the cellulose material in a swollen state is impregnated at below 20° C.

FRANK WARD.
ERNEST EDWARD TALLIS.

REFERENCES CITED

The following references are of record in the file of this patent:

UNITED STATES PATENTS

| Number | Name | Date |
|---|---|---|
| 1,879,031 | Becker | Sept. 27, 1932 |
| 2,016,299 | Schulze | Oct. 8, 1935 |
| 2,033,787 | Rigby | Mar. 10, 1936 |
| 2,511,229 | Thomas | June 13, 1950 |
| 2,530,261 | Morton et al. | Nov. 14, 1950 |

OTHER REFERENCES

Jorpes, J. E., "Heparin in the Treatment of Thrombosis," 2nd Edition, Oxford University Press, 1946, pages 48, 49.

Ott, E., "Cellulose and Cellulose Derivatives," Interscience Publishers Inc., New York city, 1943, pages 663 to 665.